United States Patent
Nordström et al.

(10) Patent No.: US 8,050,343 B2
(45) Date of Patent: Nov. 1, 2011

(54) WIRELESS COMMUNICATION METHODS AND RECEIVERS FOR RECEIVING AND PROCESSING MULTIPLE COMPONENT CARRIER SIGNALS

(75) Inventors: Fredrik Nordström, Lund (SE); Niklas Andgart, Södra Sandby (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 528 days.

(21) Appl. No.: 12/324,523

(22) Filed: Nov. 26, 2008

(65) Prior Publication Data

US 2009/0257517 A1    Oct. 15, 2009

Related U.S. Application Data

(60) Provisional application No. 61/044,685, filed on Apr. 14, 2008.

(51) Int. Cl.
 *H04L 27/28* (2006.01)
(52) U.S. Cl. ........................................ 375/260; 375/337
(58) Field of Classification Search .................. 375/260, 375/343, 316, 337
 See application file for complete search history.

(56) References Cited

U.S. PATENT DOCUMENTS

| | | | | |
|---|---|---|---|---|
| 7,965,798 B2 * | 6/2011 | Roh et al. | ....................... | 375/343 |
| 2006/0013326 A1 * | 1/2006 | Yoshida | ......................... | 375/260 |
| 2008/0137723 A1 * | 6/2008 | Liu | .............................. | 375/235 |

OTHER PUBLICATIONS

China Mobile et al., "Joint 3GPP TSG-RAN WG2+WG3 Meeting #49: R2-052925: Discussion on Potential Requirements for a Spectrum Aggregation Function," Nov. 11-15, 2005, pp. 1-6, Seoul, Korea.
ETSI MCC, "Report of the 3GPP TSG RAN IMT Advanced Workshop, REV-080060," Apr. 7-8, 2008, pp. 1-34, Shenzhen, China.
Fujitsu, "3GPP TSG-RAN1 #55bis: R1-090382: Anchor Component Carrier," Jan. 12-16, 2008, pp. 1-2, Ljubljana, Slovenia.
Sharp, "3GPP TSG RAN WG1 Meeting #55bis: R1-090020: System Level Performances of Non-Contiguous RB Assignment for LTE-Advanced Uplink," Jan. 12-16, 2008, pp. 1-6, Ljubljana, Slovenia.
Texas Instruments, "3GPP TSG RAN WG1 Meeting #55bis: R1-090284: RACH Procedure for Asymmetric Carrier Aggregation," Jan. 12-16, 2008, pp. 1-3, Ljubljana, Slovenia.
Rajbanshi, R., et al. "OFDM-Based Cognitive Radio for DSA Networks." Technical Report ITTC-FY2008-TR-31620-05. Sep. 2007. The University of Kansas, Information and Telecommunication Technology Center. Lawrence, KS. USA.

(Continued)

*Primary Examiner* — Emmanuel Bayard
(74) *Attorney, Agent, or Firm* — Coats & Bennett, P.L.L.C.

(57) ABSTRACT

A wireless communication system receiver receives and processes a signal comprising at least two component carriers carrying data scheduled to the receiver and having center frequencies spaced apart by at least one component carrier frequency difference. Each component carrier comprises a number of subcarriers spaced apart by a system subcarrier frequency spacing. A common divisor is obtained for the at least one component carrier frequency difference and the system subcarrier frequency spacing. A symbol is received on the subcarriers of the component carriers and downconverted to baseband to produce a baseband symbol. A block of padding values is inserted in the baseband symbol to produce a padded symbol. The length of the block of padding values is such that intermediate subcarriers are inserted to yield a subcarrier frequency spacing for the padded symbol equal to the common divisor. Finally the padded symbol is Fast Fourier Transform, FFT, processed.

22 Claims, 4 Drawing Sheets

OTHER PUBLICATIONS

Hung, C.H., et al. "Intercarrier Interference Compensation in Multiband OFDM UWB Sysytems." 4 pages. Proceedings, the 8th Biennial International Symposium on Communications (ISCOM), Nov. 20-22, 2005. Kaohsiung, Taiwan.

Shah, S.F.A, et al. "Efficient Design of OFDMA-Based Programmable Wireless Radios." EURASIP Journal on Wireless Communications and Networking, vol. 2008 (2008), Article ID 516763, 10 pages. Hindawi Publishing Corporation, New York, NY. USA.

Zhang, Q., et al. "An Efficient FFT for OFDM Based Cognitive Radio on a Reconfigurable Architecture." IEEE International Conference on Communications (ICC) Jun. 24-28, 2007, pp. 6522-6526. IEEE Communications Society, New York, NY. USA.

* cited by examiner

FIG. 5

WIRELESS COMMUNICATION METHODS AND RECEIVERS FOR RECEIVING AND PROCESSING MULTIPLE COMPONENT CARRIER SIGNALS

This application claims priority to U.S. Provisional Patent Application Ser. No. 61/044,685, filed Apr. 14, 2008, and incorporated herein by reference in its entirety.

TECHNICAL FIELD

The present invention relates to a wireless communication method and a wireless communication receiver for receiving and processing signals comprising two or more component carriers spaced apart in frequency.

BACKGROUND

With each generation, wireless communication systems are characterized by ever-higher data rates. While some increase in data rates may be attributed to improvements in modulation, coding, and the like, significant increases in data rates generally require higher system bandwidths. For example, the International Mobile Telecommunications, IMT, advanced a proposed fourth generation (4G) wireless communication system, contemplates bandwidths up to 100 MHz. However, the radio spectrum is a limited resource, and since many operators and systems compete for limited radio resources, it is unlikely that 100 MHz of continuous spectrum will be free for such systems.

One approach to increasing bandwidth requirements in limited, fragmented spectrum is to aggregate non-continuous spectrum. From a baseband point of view, this can effectively increase system bandwidth sufficiently to support up to 1 Gb/s, a throughput requirement for 4G systems. Transmitting data in non-continuous parts of the spectrum also introduces flexibility, as spectrum utilization may be adapted to existing spectrum use and geographical position. Additionally, different modulation and coding schemes may be advantageously applied to different portions of the spectrum.

A possible evolution of current cellular systems, such as the 3GPP Long Term Evolution (LTE), to support non-continuous spectrum is to introduce multiple component carriers or multiple bands. In such a multi-band or multiple component carrier system, each separate portion of spectrum may be considered an LTE system. Multi-band transmission is likely to be a principal part of the further releases of 3G LTE targeting ITU IMT-Advanced capabilities. A mobile terminal for use in such a system will be capable of receiving multiple component carriers, of different bandwidths, and transmitted at different carrier frequencies. This means that problems relating to inter carrier interference may occur, and methods are needed to deal with this issue.

SUMMARY

According to one or more embodiments of the present invention, inter-carrier interference, ICI, is reduced in a multiple component carrier system wherein the frequency difference between component carriers is not an integer multiple of the system subcarrier spacing frequency. A block of padding values is inserted in a baseband symbol, prior to FFT processing, to reduce the effective subcarrier spacing of the symbol so as to align each used subcarrier with an FFT subcarrier. The number of padding values inserted is determined such that the difference between any two component carrier frequencies will be an integer multiple of the subcarrier frequency spacing of the symbol with padding values inserted.

One embodiment relates to a method, in a wireless communication system receiver, of receiving and processing a signal comprising at least two component carriers having center frequencies spaced apart by at least one component carrier frequency difference and carrying data scheduled to the receiver. Each component carrier comprises a number of subcarriers spaced apart by a system subcarrier frequency spacing. A common divisor for the at least one component carrier frequency difference and the system subcarrier frequency difference is obtained. A symbol is received on the subcarriers of the component carriers and downconverted to baseband to produce a baseband symbol. Then a block of padding values is inserted in the baseband symbol to produce a padded symbol. The length of the block of padding values is such that intermediate subcarriers are added to yield a subcarrier frequency spacing of the padded symbol equal to the common divisor. Finally, the padded symbol is Fast Fourier Transform, FFT, processed.

DETAILED DESCRIPTION

In a spectrum aggregated or multi-band system as is discussed herein, several frequency bands, continuous or non-continuous, may be allocated for the communication with one mobile receiver. The modulation and access format within the band could be of any kind, e.g., orthogonal frequency division multiplexing (OFDM), single-carrier frequency division multiplexing (SC-FDMA), code-division multiple access (CDMA) etc. In this application, we denote such a system "multiple component carrier system". In this context, one band is referred to as one "component carrier". It may also be noted that this type of system in some publications is called "multi-carrier", which may cause some confusion as this term is commonly used to denote OFDM.

The component carriers of this disclosure each comprise a set of subcarriers which are processed by an FFT unit in the receiver. In other words, the subcarriers in this disclosure can be either OFDM or SC-FDMA subcarriers, or indeed some other type of subcarriers which are subject to FFT processing in a receiver.

Figure 1:
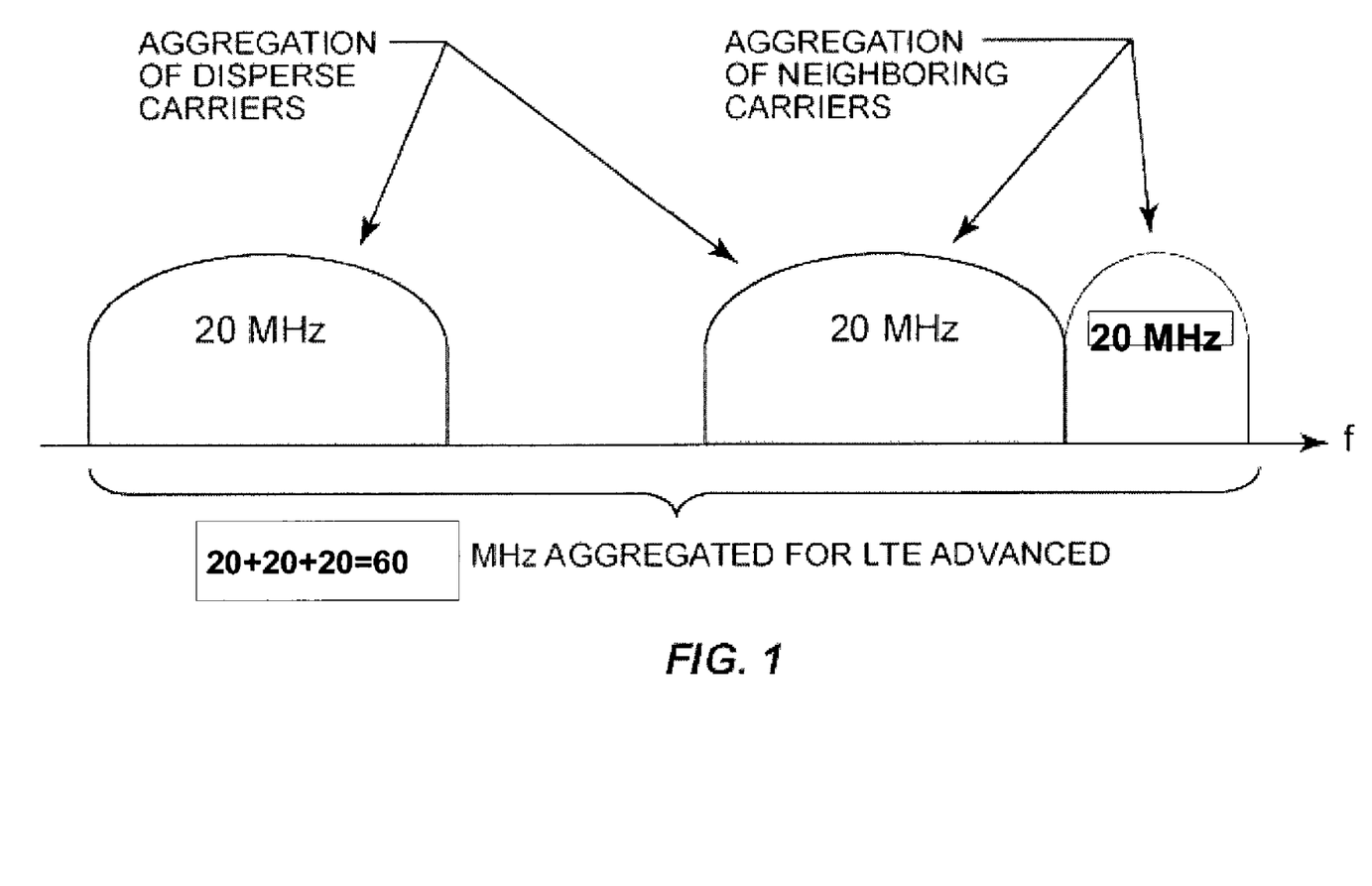
FIG. 1 is a frequency plot showing multiple component carriers of a multi-carrier OFDM transmission.

FIG. 1 depicts an example of aggregation of component carriers to achieve greater bandwidth. It may be noted that the left-most component carrier is well spaced-apart (in frequency) to the other component carriers. It will experience, and cause, only a small amount of ICI due to the wide carrier spacing. However, the two right most component carriers are not as well spaced apart in frequency. For example, assuming that they are 3G LTE carriers, there will be only a guard interval between them of 2 MHz.

In a situation where a base station is able to send data to a mobile terminal on each of these three component carriers, the terminal must be able to handle processing of all the subcarriers for all three component carriers. One solution is to have one receiver chain comprising a front end receiver, a filter, a mixer, an analog-to-digital converter (ADC) and an FFT unit per component carrier and perform processing on the subcarriers of each component carrier separately. However, in order to save cost and space in a receiver it may be an advantage to be able to process more than one of these component carriers in one and the same receiver chain, and more specifically in one and the same FFT unit.

In the pictured situation, when data to the mobile is sent on all three component carriers, one way of making processing more efficient in terms of number of receiver chains used would be to have one receiver chain dedicated to the left component carrier and one to the two component carriers to the right. The left carrier and the two carriers to the right should most likely not be processed in the same receiver chain due to the fact that there may be a lot of other, unrelated transmissions in the large gap between the left component carrier and the two component carriers to the right. The two component carriers to the right are on the other hand only separated by the small guard interval of 2 MHz. Processing these two carriers in one receiver chain means using only one front end receiver when downconverting the subcarriers of the two component carriers to the right to baseband, and only one FFT unit to process the downconverted baseband symbols. Each of the component carriers is characterized by a bandwidth, in the FIG. 1 example 20 MHz, and a center frequency.

The center frequency in an LTE system is typically a multiple of 100 kHz, i.e. the center frequencies of the component carrier lie on a 100 kHz grid. Further, the spacing between subcarriers, here denoted system subcarrier spacing, in a component carrier is normally 15 kHz. In an LTE system according to 3GPP Release 8, which in this example could correspond to using only one of the component carriers, the subcarriers will be aligned at a grid of multiples of 15 kHz (i.e. 0 kHz, 15 kHz, 30 kHz etc) after the downconversion to baseband in the receiver front end. These are also the subcarrier frequencies that the FFT unit handles. However, when downconverting a signal comprising two component carriers there is no guarantee that it will be possible to place all the subcarriers on a grid of multiples of 15 kHz, since the difference between the two center frequencies is very likely not divisible by the system subcarrier spacing (15 kHz in this example). This means that all subcarriers are no longer orthogonal and inter carrier interference may be a problem.

In other words, if the component carrier center frequency differences are not integer multiples of a system subcarrier spacing, inter-carrier interference (ICI) may occur. That is, $f_2-f_1 \neq k \cdot f_{sp}$, where $f_1$ and $f_2$ are component carrier center frequencies, $f_{sp}$ is the subcarrier frequency spacing (in LTE normally 15 kHz), and k is an integer. If $f_2-f_1 \neq k \cdot f_{sp}$ then there will be inter-carrier leakage between the subcarriers when using a single FFT processor with subcarrier spacing of $f_{sp}$. In the case that data is scheduled to a receiver on three or more component carriers, and the receiver will process all of these component carriers in a single FFT unit, the component carrier center frequency difference must be an integer multiple of the system subcarrier frequency spacing for all pairs—e.g., $f_2-f_1$, $f_3-f_1$, and $f_3-f_2$—to avoid ICI. As stated above, a receiver can avoid this ICI due to the component carrier center frequency difference by providing a complete receiver chain—front-end receiver, filter, mixer, ADC, and FFT—for each component carrier. However, this solution would add significant cost and complexity, increase power consumption, and reduce reliability. Instead a method according to embodiments of the invention may be employed where the baseband symbol is manipulated to change the subcarrier frequencies.

Returning to the above example, the center frequencies of the component carriers were placed on a 100 kHz grid while the system subcarrier frequencies were placed on a 15 kHz grid. In order to make it possible to place all subcarriers in the two component carriers on a common grid, a subcarrier spacing of maximum 5 kHz is needed since 5 is the greatest common divisor for 100 and 15. To achieve this, a block of padding values is added to the baseband symbol to make it three times as long, and in this way the subcarrier frequencies are placed on the 5 kHz grid by adding intermediate subcarriers. It may be noted that it would also be possible to use a grid of 2.5 kHz or 1 kHz or another common divisor for 100 and 15.

Regarding the choice of what information to add to the symbol to expand it onto the desired frequency grid, it may be noted that the mean value of what the mobile terminal may receive will be zero, so in some sense the most correct guess for how the baseband symbol would be continued is zero. Obviously, the "correct" continuation of the symbol is not available to the receiver, and zeros is the choice of extension symbols that will give the lowest ICI. However, it is also possible to use other padding values. A choice which would give essentially the same result as zeros is to use padding values of a magnitude that is considerably smaller than the magnitude of the symbol values. In mathematics, such a small magnitude value may often be denoted ϵ, epsilon or eps. Another way of expressing this may be that the magnitude of the padding values can be essentially zero.

Figure 4:
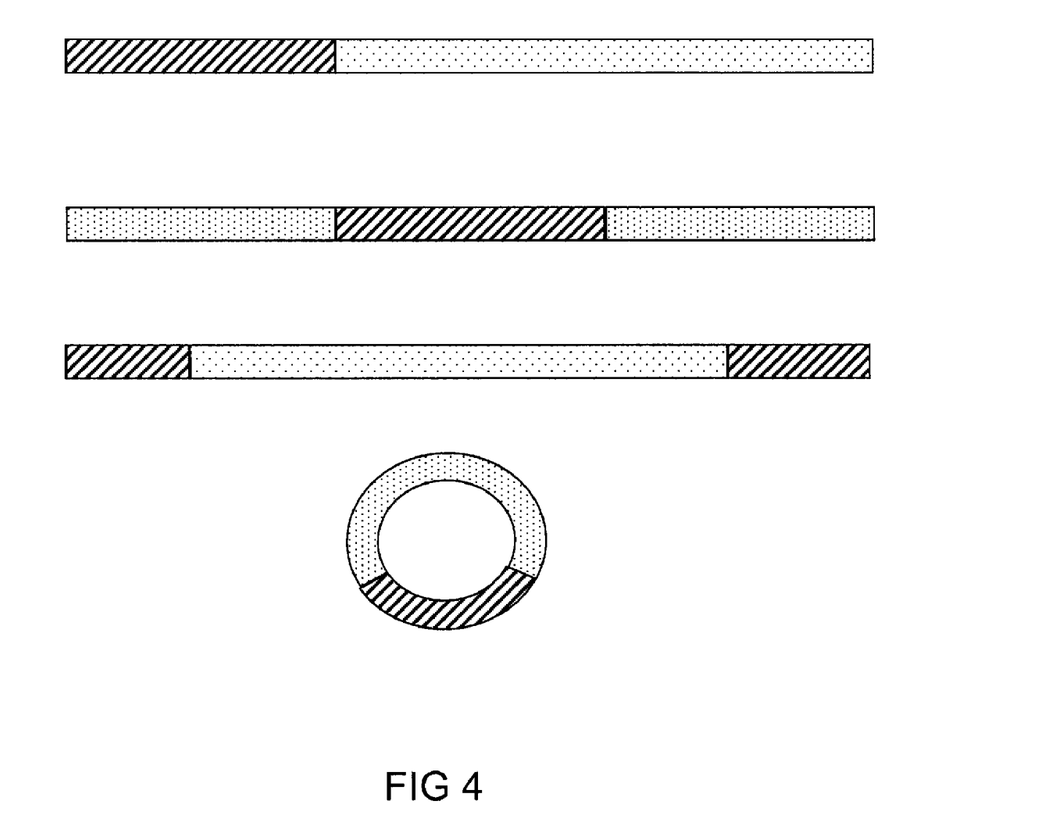
FIG. 4 is a diagram of padded symbols with padding inserted in different locations within the symbol, and a view of the symbol as a circular buffer.

Further, the symbol is viewed as a circular buffer, and the block of padding values is added as a block in a circular buffer sense, as is illustrated in FIG. 4, wherein three, essentially equivalent, padded symbols are shown for illustration purposes. Further, a circular buffer with the inserted block is also shown. The parts marked with dashes represent the original symbol, and the dotted parts the added block.

Figure 2:
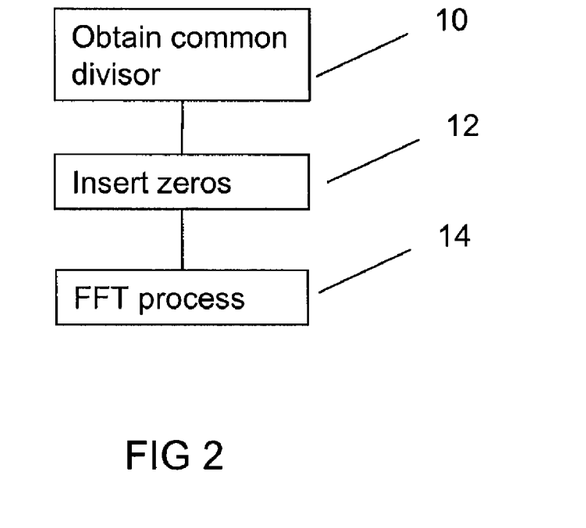
FIG. 2 is a flow diagram of a method of receiving and processing multiple component carrier signals to reduce inter-carrier interference.

FIG. 2 depicts a method of receiving and processing a signal comprising two or more component carrier signals spaced apart in frequency, in a wireless communication system receiver. The receiver first calculates, in step 10, a common divisor for the system subcarrier frequency spacing and the component carrier center frequency difference for the component carriers that are scheduled to carry data to the receiver. The system subcarrier frequency spacing may be available to the receiver, e.g., from a control channel and information regarding which component carriers carry data to the receiver may be received in a downlink scheduling message.

The receiver then, in step 12, inserts padding values in a baseband symbol, prior to FFT processing it (block 14). Padding or inserting padding values means that a block of padding values is inserted somewhere in the symbol, where the symbol should be seen as a circular buffer. In some embodiments of the invention, the padding values are inserted in the end of the symbol. In that way the phase of the channel is maintained. Padding the symbol effectively reduces the subcarrier spacing by adding intermediate subcarriers, if the FFT is large enough to process the entire bandwidth, including the additional padding values. It may be noted that these two steps may be performed by a specialized FFT having already from beginning padding values at the positions which are to be padded.

The number of padding values with which to pad the combined multi-carrier symbol, $N_{ZP}$, depends on the component carrier center frequency differences ($f_2-f_1$, $f_3-f_1$, $f_3-f_2$, etc.). The number $N_{ZP}$ is selected so that all subcarriers are placed exactly on the FFT frequencies for the expanded FFT. Assuming the component carrier center frequency difference, e.g., $f_2-f_1$, is greater than the system subcarrier frequency spacing $f_{sp}$, then $$N_{ZP} = N_{FFT} \cdot \left( \frac{f_{sp}}{f_{CD}} - 1 \right) \quad (1)$$

where $f_{CD}$ is a common divisor of $f_2-f_1$ and $f_{sp}$; and $N_{FFT}$ is the FFT size in number of subcarriers.

This may also be expressed as the frequency given by the inverse of the time duration of the FFT input (the original symbol plus the inserted block), should be factor in all component carrier differences.

If data is scheduled to the receiver in more than two component carrier signals, then $f_{CD}$ is a common divisor of all relevant component carrier frequency differences and $f_{sp}$. In some embodiments of the invention the greatest common divisor is used, but any common divisor will be possible to use. The greatest common divisor will give the least amount of padding values added. Further, the sampling rate must be larger than the Nyquist frequency for the entire bandwidth. However, the sampling rate does not increase with the padding; only the FFT size changes.

As one non-limiting example, consider the two 20 MHz 3G LTE component carriers with system subcarrier frequency spacing $f_{sp}$=15 kHz and an FFT size of 2048 for each of them. If the center frequencies of the component carriers are $f_1$=800 MHz and $f_2$=820 MHz, and the FFT size $N_{FFT}$=4096 subcarriers to hold the 40 MHz, then the length of the inserted block is $$N_{ZP} = N_{FFT} \cdot \left( \frac{f_{sp}}{f_{CD}} - 1 \right) = 4096 \cdot \left( \frac{15 \cdot 10^3}{5 \cdot 10^3} - 1 \right) = 4096 \cdot 2 = 8192$$

where $f_{CD}$ is a common divisor—in this case the greatest common divisor—of ($820 \cdot 10^6 - 800 \cdot 10^6$, $15 \cdot 10^3$)=$5 \cdot 10^3$. By inserting 8192 padding values into the symbol, the new subcarrier spacing becomes 5 kHz, and all used subcarriers are placed exactly on the FFT frequencies of the expanded FFT.

By padding the symbol, the effective subcarrier spacing frequency is reduced. However, the receiver only uses the subcarriers defined by the system, i.e. the subcarriers originally received in the component carriers. Thus, there are numerous unused subcarrier values that do not need to be computed. In the above example, only every third subcarrier is computed. Thus, as mentioned previously, the complexity of the FFT can be reduced by not computing the values for these intermediate subcarriers which were added when padding the symbol.

Figure 3A:
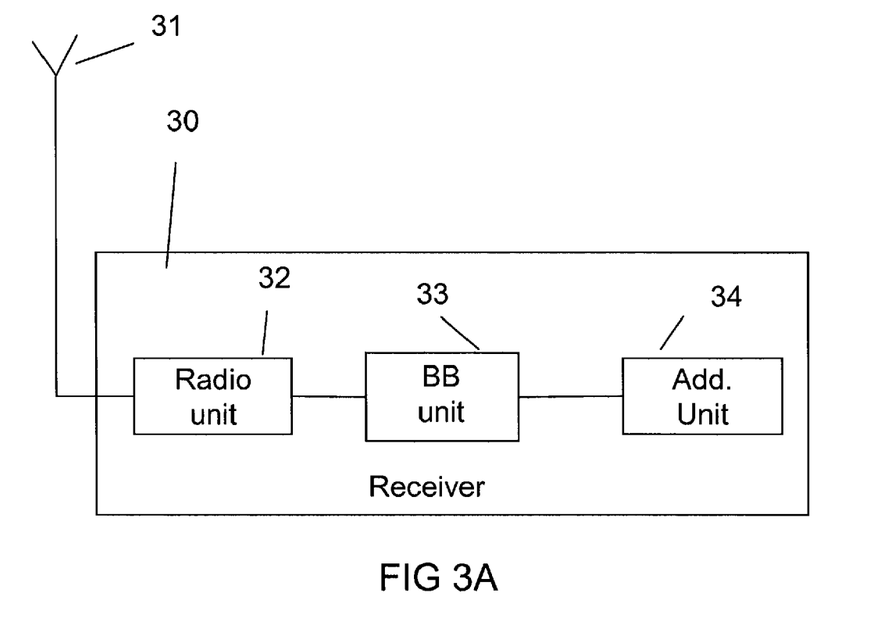
FIG. 3A is a functional block diagram of part of a receiver according to embodiments of the present invention.
Figure 3B:
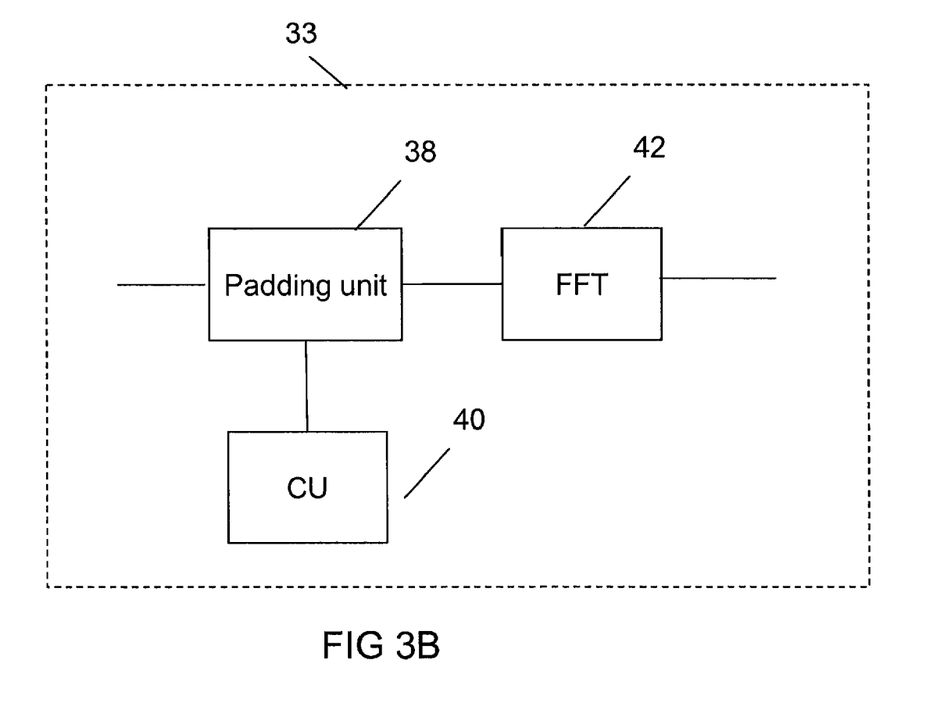
FIG. 3B is a functional block diagram of the baseband unit of FIG. 3A.

FIG. 3A depicts a receiver 30 according to one embodiment of the present invention. A signal is received at the antenna 31, and processed by front-end receiver 32 (including, e.g., low-noise amplification, analog filtering and down-conversion to baseband). The signal is then processed by a baseband unit 33. Further processing of the signal may take place in an additional unit 34. In FIG. 3B relevant parts of the baseband unit 33 is shown. A padding unit 38 inserts padding values into each baseband symbol, as calculated by a control unit 40, to reduce the effective subcarrier spacing frequency so as to place all used subcarriers exactly on a subcarrier of the FFT processing unit 42, thus reducing ICI. The symbols are then processed by the FFT unit 42. The control unit 40 may be placed outside or inside the baseband unit and may e.g. receive input from higher layers in the receiver.

As an alternative the FFT unit and the padding unit may be implemented as a specialized FFT unit which is designed with padding values at the positions which will be padded from the beginning. Then some stages in the FFT processing may be omitted and/or be less complex. This is particularly useful when the length of the block of padding values, i.e. the number of inserted padding values, is constant. This might be the case when the component carriers, their bandwidth and center frequencies, and the system subcarrier frequency spacing, are kept constant over time.

Figure 5:
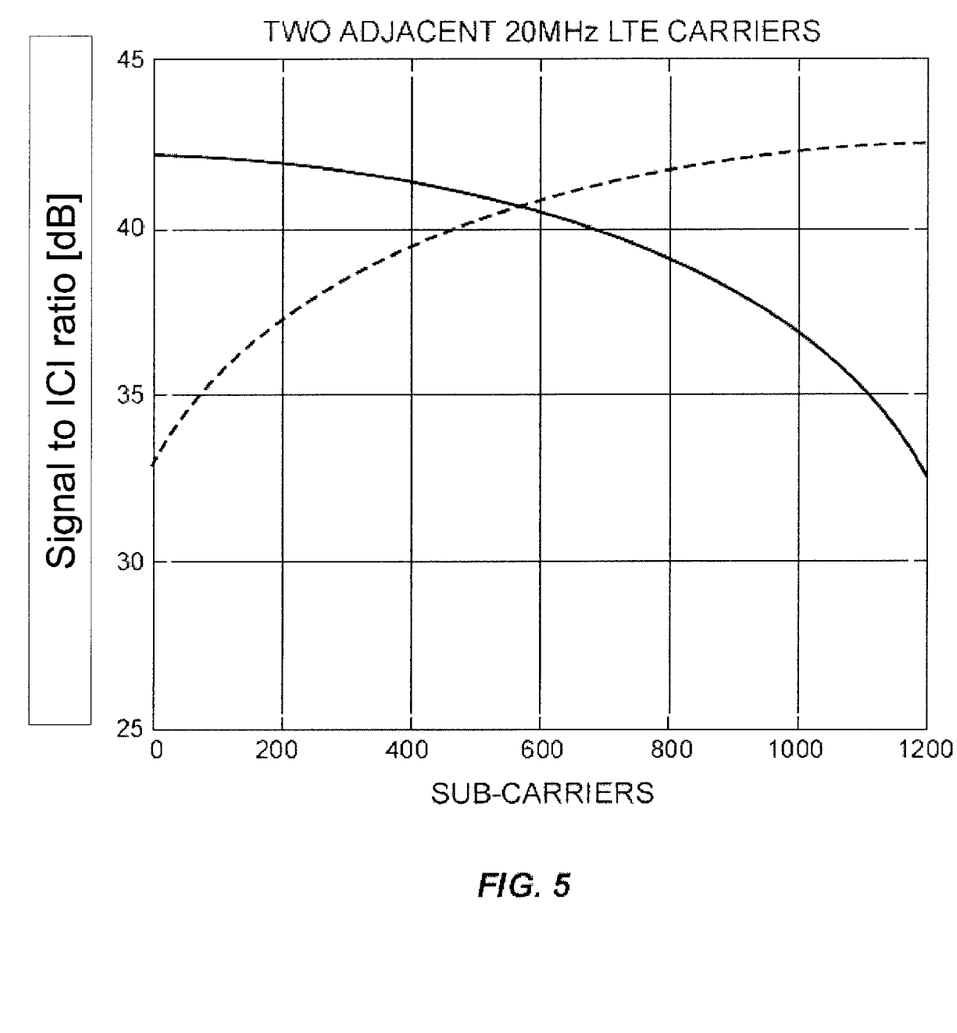
FIG. 5 is a graph depicting remaining ICI in a system employing two adjacent 20 MHz LTE carriers according to an embodiments of the present invention.

FIG. 5 depicts the remaining ICI in a system employing two adjacent 20 MHz LTE carriers. The solid line depicts the Signal to ICI ratio for the lower carrier and the dashed line depicts the Signal to ICI ratio for the upper carrier. On the horizontal axis the subcarrier number for respective carrier is depicted. It may be noted that the ICI still remaining is generated by the insertion of zeros instead of the unknown part of the symbol. As a comparison it may be noted that without using a method according to embodiments of the invention, simulations have shown that the Signal to ICI ratio would be far less than 10 dB for at least one of the components.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, in a wireless communication system receiver, of receiving and processing a signal comprising at least two component carriers carrying data scheduled to the receiver and having center frequencies spaced apart by at least one component carrier frequency difference, wherein each component carrier comprises a number of subcarriers spaced apart by a system subcarrier frequency spacing, the method comprising:
    obtaining a common divisor for the at least one component carrier frequency difference and the system subcarrier frequency spacing,
    receiving a symbol on the subcarriers of the component carriers and downconverting it to baseband, to produce a baseband symbol,
    inserting a block of padding values in the baseband symbol to produce a padded symbol, wherein the length of the block is such that intermediate subcarriers are added to yield a subcarrier frequency spacing for the padded symbol equal to the common divisor, and
    Fast Fourier Transform (FFT) processing the padded symbol.

2. The method of claim 1, wherein the magnitude of the padding values is smaller than the magnitude of the symbol.

3. The method of claim 1, wherein the padding values are zeros.

4. The method of claim 1, wherein inserting a block of padding values in the symbol to produce a padded symbol comprises inserting the block in the symbol while viewing the symbol as a circular buffer.

5. The method of claim 1, wherein inserting a block of padding values in the symbol to produce a padded symbol comprises inserting the block at the end of the symbol.

6. The method of claim 1, wherein obtaining a common divisor for the at least one component carrier frequency difference and the system subcarrier frequency spacing comprises obtaining a greatest common divisor for the at least one component carrier frequency difference and the system subcarrier frequency spacing.

7. The method of claim 1, further comprising determining the length of the block of padding values by:

$$N_{ZP} = N_{FFT} \cdot \left(\frac{f_{sp}}{f_{CD}} - 1\right),$$

where $N_{ZP}$ is the length of the block of padding values;
$f_{sp}$ is the system subcarrier frequency spacing;
$N_{FFT}$ is the number of subcarriers in the FFT processing; and
$f_{CD}$ is the common divisor.

8. The method of claim 1, wherein the inserting of the block of padding values is performed by a specialized FFT unit having padding values at positions corresponding to the inserted block of padding values.

9. The method of claim 1, wherein, in the FFT processing of the padded symbol, only subcarriers corresponding to subcarriers of the component carriers are calculated and intermediate subcarriers added in the inserting step are disregarded.

10. The method of claim 1, wherein the at least two component carriers are Orthogonal Frequency Division Multiplexing, OFDM, carriers.

11. The method of claim 1, wherein the wireless communication system is a Long Term Evolution, LTE, Advanced or an International Mobile Telecommunications, IMT, Advanced communication system.

12. A wireless communications receiver for receiving and processing a signal comprising at least two component carriers carrying data scheduled to the receiver and having center frequencies spaced apart by at least one component carrier frequency difference, wherein each component carrier comprises a number of subcarriers spaced apart by a system subcarrier frequency spacing, wherein the receiver is adapted to receive a symbol on the subcarriers of the component carriers and downconvert it to baseband to produce a baseband symbol, and wherein the receiver comprises:

a control unit operable to obtain a common divisor for the at least one component carrier frequency difference and the system subcarrier frequency spacing, a padding unit operable to insert a block of padding values in the baseband symbol to produce a padded symbol, wherein the length of the block of padding values is such that intermediate subcarriers are added to yield a subcarrier frequency spacing for the padded symbol equal to the common divisor, and an FFT unit operable to perform fast Fourier transform processing of the padded symbol.

13. The method of claim 12, wherein the magnitude of the padding values is smaller than magnitude of the values of the baseband symbol.

14. The method of claim 12, wherein the padding values are zeros.

15. The receiver of claim 12, wherein the padding unit is adapted to insert a block of padding values in the symbol while viewing the symbol as a circular buffer.

16. The receiver of claim 12, wherein the padding unit is adapted to insert the block of padding values at the end of the symbol.

17. The receiver of claim 12, wherein the control unit is adapted to obtain the greatest common divisor for the at least one component carrier frequency difference and the system subcarrier frequency spacing.

18. The receiver of claim 12 wherein the padding unit is adapted to determine the length of the block of padding values by:

$$N_{ZP} = N_{FFT} \cdot \left(\frac{f_{sp}}{f_{CD}} - 1\right),$$

where $N_{ZP}$ is the length of the at least one block of padding values;
$f_{sp}$ is the system subcarrier frequency spacing;
$N_{FFT}$ is number of subcarriers in the FFT unit; and
$f_{CD}$ is the common divisor.

19. The receiver of claim 12, wherein the padding unit and the FFT unit are comprised in a specialized FFT unit which is adapted to comprise padding values at positions corresponding to the inserted block of padding values.

20. The receiver of claim 12, wherein the FFT unit is adapted to calculate only subcarriers corresponding to subcarriers of the component carriers and disregard intermediate subcarriers added in the inserting step.

21. The receiver of claim 12, wherein the component carriers are Orthogonal Frequency Division Multiplexing, OFDM, carriers.

22. The receiver of claim 12 wherein the receiver is adapted to operate in a Long Term Evolution (LTE) Advanced or an International Mobile Telecommunications (IMT) Advanced communication system.

* * * * *

UNITED STATES PATENT AND TRADEMARK OFFICE
CERTIFICATE OF CORRECTION

| | | |
|---|---|---|
| PATENT NO. | : 8,050,343 B2 | Page 1 of 1 |
| APPLICATION NO. | : 12/324523 | |
| DATED | : November 1, 2011 | |
| INVENTOR(S) | : Nordstrom et al. | |

It is certified that error appears in the above-identified patent and that said Letters Patent is hereby corrected as shown below:

On Title Page 2, in item (56), under "OTHER PUBLICATIONS", in Column 1, Line 2, delete "Sysytems."" and insert -- Systems." --, therefor.

In Fig. 2, Sheet 2 of 4, delete "FIG 2" and insert -- FIG. 2 --, therefor.

In Fig. 4, Sheet 2 of 4, delete "FIG 4" and insert -- FIG. 4 --, therefor.

In Fig. 3A, Sheet 3 of 4, delete "FIG 3A" and insert -- FIG. 3A --, therefor.

In Fig. 3B, Sheet 3 of 4, delete "FIG 3B" and insert -- FIG. 3B --, therefor.

In Column 8, Line 6, in Claim 13, delete "method" and insert -- receiver --, therefor.

In Column 8, Line 9, in Claim 14, delete "method" insert -- receiver --, therefor.

Signed and Sealed this
Twenty-eighth Day of August, 2012

David J. Kappos
*Director of the United States Patent and Trademark Office*